Feb. 28, 1933.  A. R. SIMON ET AL  1,899,903
ATTACHMENT FOR SPECTACLES
Filed Jan. 7, 1932
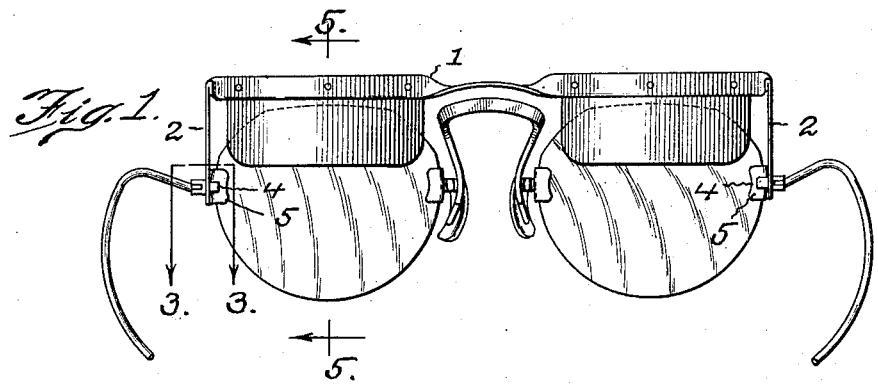
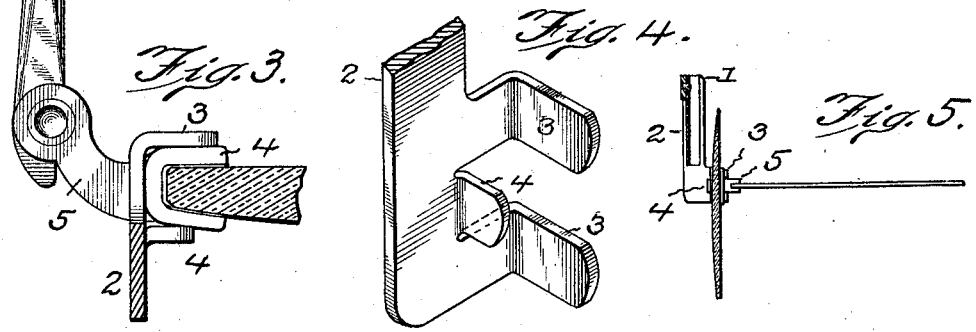
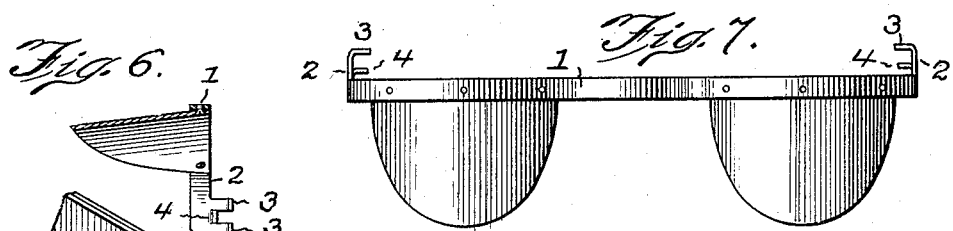
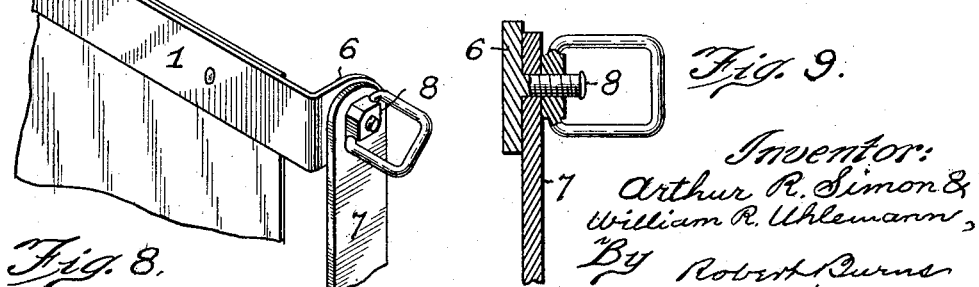
Inventor:
Arthur R. Simon &
William R. Uhlemann,
By Robert Burns
Atty.

Patented Feb. 28, 1933

1,899,903

UNITED STATES PATENT OFFICE

ARTHUR R. SIMON, OF LA PORTE, INDIANA, AND WILLIAM R. UHLEMANN, OF CHICAGO, ILLINOIS, ASSIGNORS OF ONE-THIRD TO RICHARD H. UHLEMANN, OF CHICAGO, ILLINOIS

ATTACHMENT FOR SPECTACLES

Application filed January 7, 1932. Serial No. 585,194.

This invention relates to that type of removable attachments for spectacle frames in which the frame of the attachment by which a pair of supplementary lens, dimmers, visors, is removably secured to the outer ends of the lens frame or clips of the spectacles, in proper and fixed relation to the axes of the lens thereof. And this improvement has for its objects:

To provide a structural formation of the carrying frame of an attachment of the type above referred to, and wherein a simple and effective detachable connection is had between said frame and the frame or end pieces of the spectacle lens.

To provide in a carrying frame of the type above referred to, means whereby the main portion of the frame is adjustably connected to the frame or lens clips of the spectacles so that said main portion of the frame and the auxiliary lens, dimmers or visors carried thereon may be angularly adjusted in relation to the lens of the spectacles, as conditions may require in actual use of the attachment, all as will hereinafter more fully appear.

In the accompanying drawing:

Fig. 1 is a front elevation of a pair of spectacles with the present attachment in its dimmer form, applied and shown in position in front of the upper portions of the spectacle lens.

Fig. 2 is a top view of the attachment.

Fig. 3 is an enlarged detail sectional plan, on line 3—3 Fig. 1.

Fig. 4 is a detail perspective view of an attaching end of the carrying frame of the attachment.

Fig. 5 is a vertical section on line 5—5 Fig. 1.

Fig. 6 is an end elevation of the attachment in its visor form.

Fig. 7 is a plan view of the same.

Fig. 8 is a detail perspective view of the adjustable connection between the main frame of the attachment and the end carrying and attaching bars of the same.

Fig. 9 is an enlarged detail vertical section of the same.

Like reference numerals indicate like parts in the several views.

In the simpler and more generally used form of this invention, shown in Figs. 1 to 7 inclusive, the carrying frame 1 of the appliance is formed from a single strip or bar of metal or like rigid and substantial material, of a length corresponding with the extreme width of the frame of the spectacles, and having down turned integral extensions 2 at its respective ends, which in this invention are formed as follows:

The lower end of each downward extension 2 is formed with a pair of rearwardly arranged and inwardly extending prongs 3 in vertically spaced relation, and with a single forward prong 4 in spaced and alternating or staggered relation to the pair of prongs 3, as shown. The arrangement is such that the rearward prongs 3 are adapted to straddle and pass over an attaching end piece 5 of the carrying frame or clips of the lens members of the spectacles and have bearing engagement against a rear face of said frame or clip, while the single forward prong 4 is adapted to have bearing against the front surface of said frame or clip of the spectacles with the described formation assuring a position of the main portion of the carrying frame 1 out of the line of vision and an objectionable interference in same.

The scope of this invention involves in addition to the single piece formation of the carrying frame 1, above described, a formation of each depending portion thereof in two parts, with one part 6 forming an angularly disposed and integral part of the frame 1, while the companion portion 7 has a similar formation at its lower end of inwardly extending holding prongs, similar to those heretofore described in the simpler type of the carrying frame and for like holding engagement with a lens holding frame or clip of the spectacles, and with its upper end pivotally connected to its companion part 6 of the carrying frame 1, and preferably by a clamping bolt 8 as shown in Figs. 8 and 9.

With such construction, angular adjustment of the carrier frame 1 with the pair of auxiliary lens, dimmers or visors mounted thereon can be varied to any required extent, and even to a displacement of the carrying frame 1 and parts wholly out of the light path of the spectacle lens.

Having thus fully described our invention, what we claim as new, is:—

1. A disconnectable attachment for spectacles, comprising means for correcting and varying the conditions in the light path of the spectacle lens, a carrier frame for such means formed of a strip of rigid material of a length corresponding with the width of the spectacles, and having angular downwardly extending end extensions adapted for engagement with the outer edges of the spectacle frame with the main portion of the carrying frame in adjacent relation to the upper edge of said spectacle frame in actual use, the lower end of each angular extension being formed with a pair of inturned rear prongs in vertical spaced relation and with a forward inturned prong in spaced and staggered relation to the rear prongs aforesaid with said prongs adapted for holding engagement with the lens frame or clip of the spectacles.

2. A disconnectable attachment for spectacles as specified in claim 1 aforesaid, and wherein each angular extension of the carrier frame is formed in two parts, one part whereof is integral with said carrier frame and the other part is pivotally secured to said integral part of the carrying frame.

3. A disconnectable attachment for spectacles, as specified in claim 1, and wherein each angular extension of the carrier frame is formed in two parts pivotally connected together, the pivotal means between the parts of the downturned extensions of said carrier frame being in the form of a clamping screw and nut.

In testimony whereof we hereunto affix our signatures.

ARTHUR R. SIMON.
WILLIAM R. UHLEMANN.